United States Patent
Kiernan et al.

(10) Patent No.: US 6,728,594 B1
(45) Date of Patent: Apr. 27, 2004

(54) CENTRAL CONTROL SYSTEM AND METHOD FOR FINE TUNING INDIVIDUAL CIGARETTE MANUFACTURING CONTROL SYSTEMS

(75) Inventors: Steve Kiernan, Westerville, OH (US); David Honigford, Grove City, OH (US); Mike Iaquinta, Westerville, OH (US); John Wendt, Columbus, OH (US)

(73) Assignee: Automation and Control Technology, Inc., Columbus, OH (US)

( * ) Notice: Subject to any disclaimer, the term of this patent is extended or adjusted under 35 U.S.C. 154(b) by 0 days.

(21) Appl. No.: 10/209,424

(22) Filed: Jul. 30, 2002

Related U.S. Application Data

(63) Continuation-in-part of application No. 09/996,317, filed on Nov. 20, 2001, now Pat. No. 6,675,073.

(51) Int. Cl.[7] ............................................. G06F 19/00
(52) U.S. Cl. ........................ 700/173; 700/28; 700/37; 702/81; 702/84; 702/182; 131/280; 131/282
(58) Field of Search ................... 700/28, 29, 32, 700/37, 45, 173, 46; 702/182, 81, 84; 131/280, 282; 198/572; 209/535, 536

(56) References Cited

U.S. PATENT DOCUMENTS

| | | | | |
|---|---|---|---|---|
| 3,849,712 A | * | 11/1974 | Lankford et al. ............ 318/561 |
| 4,149,545 A | * | 4/1979 | Hall ............................ 131/283 |
| 4,359,152 A | * | 11/1982 | Czoch et al. ................ 198/572 |
| 4,574,958 A | * | 3/1986 | Manservisi .................. 209/535 |
| 5,457,625 A | * | 10/1995 | Lim et al. ..................... 700/29 |
| 5,627,372 A | | 5/1997 | Sturm ........................... 250/308 |
| 5,682,309 A | * | 10/1997 | Bartusiak et al. ............. 700/29 |
| 5,695,070 A | * | 12/1997 | Draghetti ..................... 209/536 |
| 6,128,541 A | * | 10/2000 | Junk ............................. 700/39 |
| 6,564,117 B1 | * | 5/2003 | Chen et al. .................. 700/129 |
| 6,591,145 B1 | * | 7/2003 | Hoskinson et al. ........... 700/28 |
| 6,614,050 B1 | * | 9/2003 | Yamada et al. ............... 257/48 |
| 6,618,682 B2 | * | 9/2003 | Bulaga et al. ................. 702/84 |
| 6,629,010 B2 | * | 9/2003 | Lieber et al. ................ 700/109 |

* cited by examiner

Primary Examiner—Ramesh Patel
Assistant Examiner—Crystal J Barnes
(74) Attorney, Agent, or Firm—Standley Law Group LLP

(57) ABSTRACT

The present invention includes a central control system and method for fine tuning a cigarette manufacturing process. A measurement device captures measurements of particular cigarette properties. The measurement data is sent to and stored in a central database. Once sufficient measurement data has been stored, the data is loaded into an optimization program that outputs optimized controlled parameters that may be used by individual control systems to better control the properties of the cigarettes during manufacture. The central control system and method may be used with both off-line and in-line measurement devices, and can communicate and control such devices regardless of the manufacturer thereof.

20 Claims, 3 Drawing Sheets

CENTRAL CONTROL SYSTEM AND METHOD FOR FINE TUNING INDIVIDUAL CIGARETTE MANUFACTURING CONTROL SYSTEMS

This application is a continuation-in-part of U.S. patent application Ser. No. 09/996,317, now U.S. Pat. No. 6,675,073, filed Nov. 20, 2001.

BACKGROUND AND SUMMARY OF THE INVENTION

The present invention relates generally to control tuning in a manufacturing process. Specifically, the invention relates to the optimization of one or more process control devices by measuring and collecting data on the physical properties of articles moving through a manufacturing process. More specifically, the present invention relates to the optimization of one or more process control devices used in cigarette manufacturing, through remote and/or in-line testing of individual cigarettes, and by collection of the test data in a central data base.

During cigarette manufacturing, it is necessary to measure and control the physical properties of the cigarettes being made. Differences between a target measurement for a given physical property of a cigarette and its actual measurement can lead to excessive scrap, wasted machine time or lost orders, as the end product may be rejected by a demanding customer. Several known devices have been designed and utilized to analyze the physical properties of cigarettes. These devices may monitor such properties as length, diameter, weight, texture, moisture content, hardness, and so forth. These known systems have generally failed to provide for adequate control over cigarette properties during manufacturing, however, due at least in part to the fact that such analyses typically occur off-line, and the results of the analyses are not available in real-time for use in adjusting the manufacturing process.

Use of these known devices typically requires that one or more cigarettes be periodically removed from a cigarette production line for testing. The cigarettes may be removed manually, or by automated machinery. The removed cigarettes are then generally supplied to a plurality of testing equipment in order to determine the aforementioned characteristics of an average cigarette. Once testing is completed, an operator can use the data to adjust the manufacturing process accordingly. For example, the operator might increase or decrease the amount of tobacco placed into the cigarette.

In U.S. patent application Ser. No. 09/966,317, which is hereby incorporated by reference herein, a system and method is disclosed for automatically tuning the weight control of a flow of material—such as the flow of tobacco into a cigarette. The system and method described therein examines long term standard deviation that occurs during the manufacturing process and makes adjustments accordingly. More specifically, the system and method allows for the "fine tuning" of the manufacturing process, such that a given article, such as a cigarette, can be more accurately produced.

According to the system and method of U.S. patent application Ser. No. 09/966,317, weight measurements of a flow are captured at synchronized intervals over the length of the flow, and proportional and integral calculations are thereafter performed on these weight measurements. A weight measurement device is preferably used to capture the desired unit weight measurements of the flow at proper intervals over the length thereof. A control actuator, in communication with a controller and control loop, is preferably used to change the unit volume of the flow so as to sufficiently maintain a target unit weight. Based on the results of the proportional and integral calculations, the flow may be adjusted to compensate for the duration of any deviation in the weight measurements from a target weight, and further deviations may be anticipated such that the total amount of deviation is reduced.

The system and method of U.S. patent application Ser. No. 09/966,317 preferably employs a proportional, integral, derivative (PID) algorithm and control loop to make the calculations and adjustments necessary to fine tune the device. In certain embodiments of the present invention, preferably only the proportional and integral portions of the PID algorithm are utilized, although the derivative portion may also be used if desired.

Essentially, the proportional portion of the control loop measures the error or deviation between a setpoint weight value and a measured weight value of the flow. Under proportional control, an attempt is made to adjust the output of a flow adjusting device connected to the control actuator so that any error between the setpoint weight value and a measured weight value of the flow is removed. This is accomplished by the amount of change that will occur in the output of the control actuator as a result of a change to a corresponding input thereof. With error and gain known, the bias of the PID controller may then be adjusted (or the controller "reset") in order to move the output of the control actuator as necessary to cause the weight of the flow to reach the setpoint value. The integral portion of the PID control loop is then used to continually and more accurately adjust the bias of the controller. Without the integral portion of the control loop, bias adjustments to the controller would have to be accomplished manually. To more accurately tune the device, the integral portion of the PID control loop may effect an automatic bias adjustment (automatic reset) whenever an error between the setpoint value and measured value are detected.

To accomplish fine tuning, small adjustments (bumps) are periodically and manually made to the input of the control actuator. In response to the input change, the output of the control actuator will cause movement of the flow adjusting device for a specified amount of time. Individual weight measurements are taken, preferably from a time before each bump to the input is initiated, through a time after the output has fully responded to the change in the input. Weight measurements are collected for each of the bumps, and the collected data is fed into an optimization program. Based on the collected data it receives, the optimization software can then generate tuned control parameters for use by the PID control loop. Therefore, by utilizing the tuned control parameters, the system and method of U.S. patent application Ser. No. 09/966,317 allows the mean weight of the material flow to be more quickly and more accurately adjusted and controlled than is possible with known systems and methods.

As described above, weight measurements of the flow are captured in real-time by locating a weight sensor in the path of the cigarettes as they are manufactured. Measurement data is stored in a database. The stored data is then properly compiled, and loaded into a control optimization program. Based on the collected data it receives, the control optimization software generates tuned control parameters which may then be input into the weight control system of the invention. The tuned control parameters allow the PID controller and control loop to more quickly and accurately adjust and control the mean weight of the material flow and subsequently produced cigarettes or other articles than would otherwise be possible. This process can also be employed to control other cigarette properties during manufacturing. By collecting appropriate data, an optimization program may be used to output control parameters for various control systems within the cigarette manufacturing process.

However, it is realized that certain measurements and data collection may often not be accomplished without first removing a cigarette, or cigarettes, from the production line for testing. It is still desirous, however, that the results of any off-line testing conducted on the removed cigarettes be available, preferably in real-time, for use in optimization of the ongoing manufacturing process. The collected data may also be analyzed during non-production periods, so that adjustments can be made once production resumes. The optimization process for a given control system may be substantially as described above with regard to weight control tuning, but may, of course, also be altered to best accomplish optimization of a particular manufacturing parameter. For example, it should be realized that control systems for adjusting cigarette properties such as length or diameter may be of significantly different design than the weight control system described above. Thus, it should be understood that the collected data relative to a particular cigarette property or characteristic can be operated on in various ways to produce the desired optimization parameters, and such parameters may be generated mindful of the design of the particular control device to which they will be provided.

To this end, it is contemplated that a central control system comprising a database and optimization software as disclosed in U.S. patent application Ser. No. 09/966,317 be centrally located and adapted for communication with a variety of remotely located testing equipment. The central control system can then be utilized to perform control tuning on the various individual control systems that regulate the cigarette properties. Each piece of testing equipment preferably provides test data to the central database, where the test data can be appropriately stored. Once a sufficient amount of data has been collected and stored regarding a specific cigarette property, the data may be fed to optimization software. The control parameters resulting from the optimization operation may then be fed to an appropriate control system to automatically adjust the manufacturing process, thereby controlling the cigarette property of interest.

The central control system may be connected to a multitude of different sensors and testing equipment, and to sensors and testing equipment from different manufacturers. Thus, the central control system of the present invention can be integrated into the cigarette manufacturing process even if the testing equipment used therein is from a plurality of different manufacturers. In this manner, it is also possible to accomplish automatic, rather than manual adjustment of manufacturing parameters, even though testing is done off-line. This is accomplished by placing each piece of testing equipment in communication with the database and optimization software of the central control system. Rather than depending on an operator to collect and analyze test data from a plurality of different equipment, at a variety of locations, all test data may be automatically sent to the central database as soon as testing is completed. Alternatively, the data collected by each piece of testing equipment may be supplied to the central database during a period of non-production, for use when production resumes.

When the latter method is employed, the optimization software may act on the data, but adjustment of individual control systems may be reserved until production is again underway.

It should be understood that when using the central control system and method of the present invention with off-line testing equipment, cigarettes may be removed from the production line manually, or by automated equipment—such as by robotic means. When automatic cigarette removal is utilized, a single removal device may remove the required number of cigarettes from the production line and distribute them amongst the existing testing equipment. Alternatively, more than one removal device may be employed for this purpose. Various equipment currently exists for accomplishing automatic removal and testing of cigarettes, and the central control system of the present invention is designed to interface with such equipment. The central control system of the present invention may also be adapted to control and direct this and other automatic cigarette removal equipment, such that test data can be obtained at desired intervals. The central control system of the present invention may also, in addition to communicating with various, existing equipment, control its operation. It is also possible to utilize a combination of in-line and off-line testing equipment to obtain the required data. In any case, the central database receives and stores measurement data from the various sensors and test equipment. The stored data may then be compiled or otherwise acted upon prior to its output to the optimization software. The optimization software then determines optimized control systems for input to the various control devices that regulate the cigarette manufacturing process.

BRIEF DESCRIPTION OF THE DRAWINGS

In addition to the novel features and advantages mentioned above, other objects and advantages of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The present invention is directed to a system and method for fine tuning the control of various cigarette properties during the manufacturing process, by collecting, in a central database, measurement data from off-line and/or in-line testing equipment and sensors.

Figure 1:
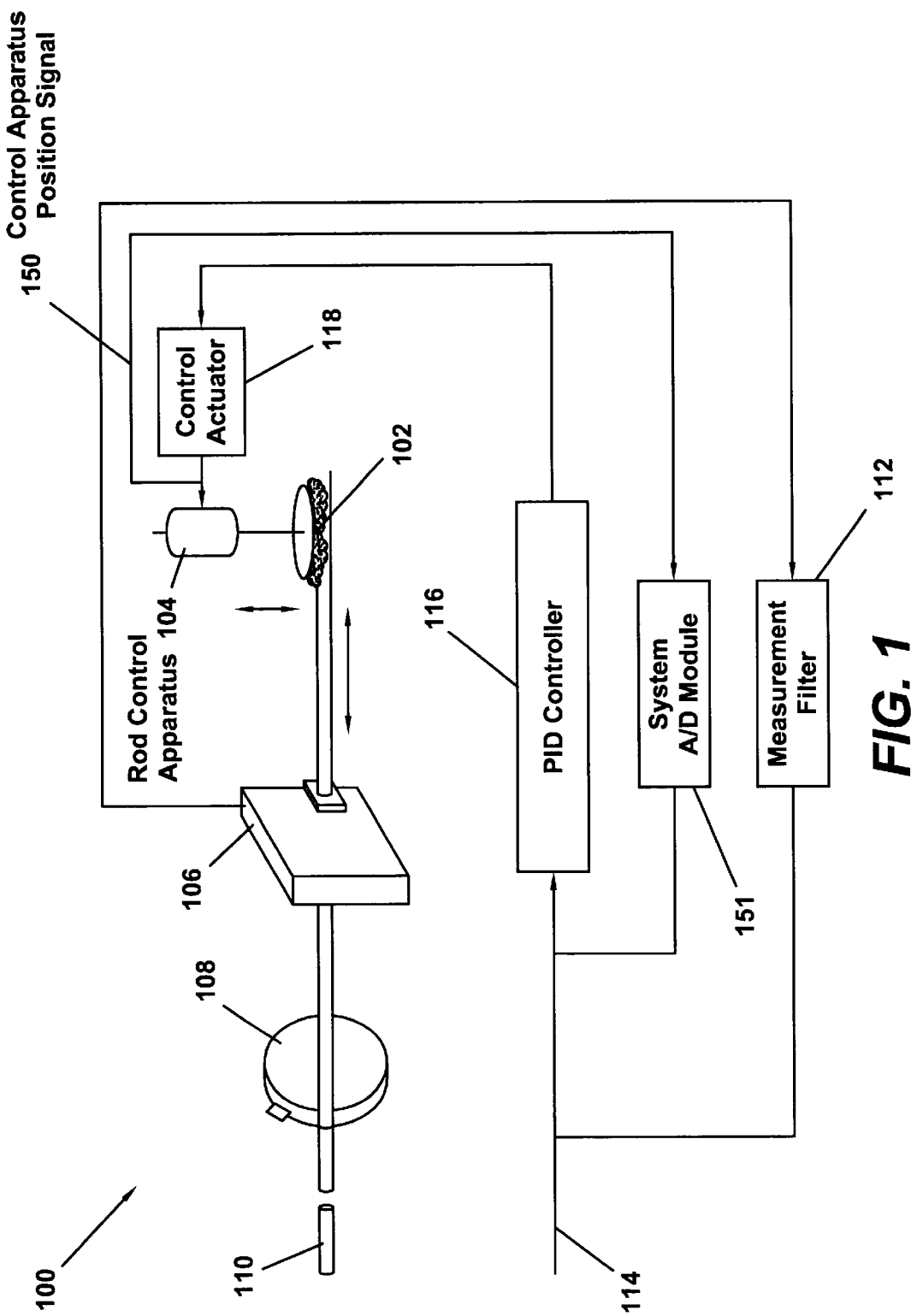
FIG. 1 is a diagram of one embodiment of a weight control tuning apparatus according to the present invention.

An exemplary weight control tuning system 100 of the present invention is shown in FIG. 1. In this system, a flow of material 102 is passed to a weight measurement sensor 106. The flow of material 102 is preferably in a form conducive to placement in a rod formation. The weight measurement sensor 106 may be any appropriate sensor for making precise measurements of rod weight over the length of the flow 102, but preferably utilizes beta, microwave, or x-ray technology for fast, highly accurate rod weight measurement. A preferred weight measurement sensor 106 may include, for example, a fast-response ionization chamber containing measurement stability-maintaining electronics adapted to alleviate the need for internal temperature compensation. When used for measuring the weight of tobacco cigarettes, for example, a preferred weight measurement sensor 106 measures the weight at or near at least 24 points along the length of each cigarette rod, but preferably may also measure the weight at more than 24 points. The weight measurements obtained by the measurement sensor 106 may be recorded at speeds exceeding, for example, 12,000 rods per minute. A true calibration curve is preferably used to determine weight, thereby eliminating errors inherent in conventional straight-line approximations. When the system of the present invention is used in the manufacture of tobacco cigarettes, the flow of material (tobacco) may be wrapped in paper and cut, such as by a knife cutter 108, into individual cigarettes 110.

Measurements taken from the measurement sensor or sensor unit 106 are sent to a proportional, integral, derivative (PID) control loop, which determines the corrections to be transmitted to the control actuator 118 that is adapted to adjust a rod control apparatus 104. The rod control apparatus 104 is preferably employed to alter the amount of material per unit length in order to compensate for changes in rod weight. For example, in one embodiment of the present invention adapted for use in the manufacture of tobacco cigarettes, the rod control apparatus includes a horizontally situated trimmer (not shown) that removes more tobacco from an underlying suction band when moved closer to the flow of tobacco, and allows more tobacco to remain on the underlying suction band when moved farther away from the flow of tobacco.

A PID control loop and PID controller 116 may be used in order to more accurately and efficiently control individual rod weight, and to automatically compensate for process dynamics and the time delay between control actions and system measurements. The PID control loop may preferably use a first measurement filter 112 to filter out any extraneous data sent by the measurement unit 106, such as glitches or extreme readings due to misplaced or miscut material. This filtered measurement data is then preferably compared to the target weight 114 and passed to the PID controller 116.

The PID controller 116 allows adjustment of the output signal sent to the control actuator 118 based on the duration of any measured error, not just the magnitude of that error as in previous systems. Consequently, as long as an error offset exists, the integral portion of the PID control loop may continue to cause the output of the actuator to adjust the rod control apparatus 104 in an attempt to reduce the error measurement to zero.

On many processes there is a control apparatus position signal 150 that is a "feed back" position signal into the system A/D module 151 and it is used to monitor whether the rod control apparatus 104 is on a limit.

Figure 2:
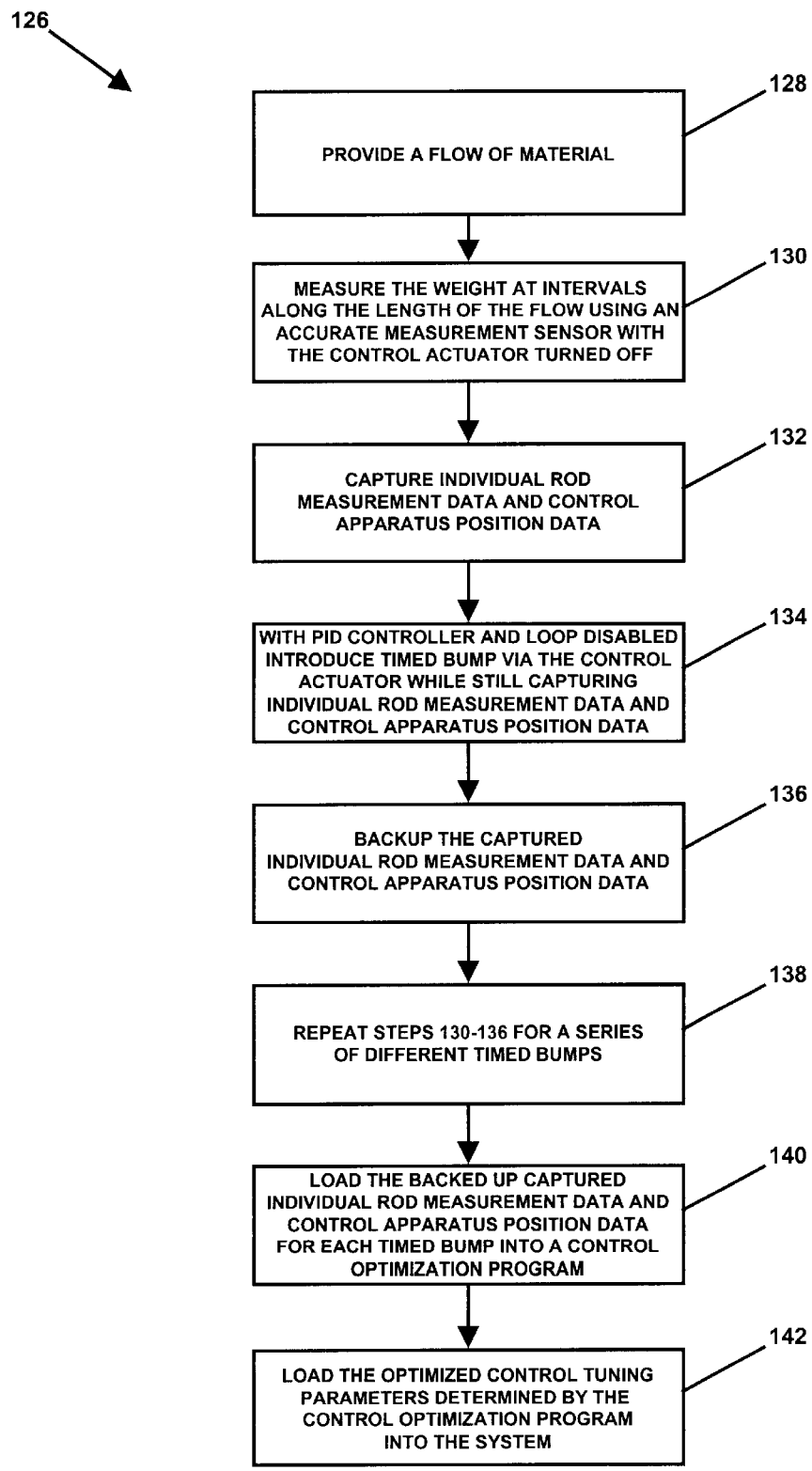
FIG. 2 is a flow chart showing the basic steps of an exemplary weight control tuning method in accordance with one embodiment of the present invention.

The steps of an exemplary method 126 of fine tuning a weight control system according to one aspect of the present invention are shown generally in FIG. 2. In this method, a flow of material, such as a rod-like flow of material, is provided 128 during the cigarette manufacturing process. With the control actuator 118 turned off, and using a sufficiently accurate measurement sensor or other measurement device, the weight of the flow is measured 130 at multiple intervals along a predetermined length defining an individual rod. In this manner, the measurement data for each individual rod may then be captured 132 and stored.

After capturing individual rod measurement data 132 and "feed back" position data, and with the PID controller and PID control loop disabled, a timed bump, or step, is preferably introduced 134 to the input of the controller by briefly manually activating the control actuator 118, and subsequently the rod control apparatus 104. The rod control apparatus 104 will then move, as directed, toward or away from the flow of material 102 for the amount of time input to the control actuator 118. Movement of the rod control apparatus 104 will generally result in a change in the weight of the flow of material 102. An observable change in the weight of the flow of material 102 may lag somewhat behind the activation of the control actuator 118 and rod control apparatus 104, and the full effect of the bump will typically occur gradually as the rod control apparatus completes its movement. Thus, it is preferable that individual rod measurement data be continually captured and stored 136 for a predetermined period of time—preferably before, during and after initiation of the bump. In this manner, weight measurement data may be obtained prior to the change in the output caused by the bump and compared with weight measurement data collected after the change in the output is completed.

Preferably, steps 130–136 are repeated for a series of different timed bumps 138 that are initiated over a length of the flow. Each bump may be initiated, for example, to coincide with the passage of a particular number of individual rods that will produce data sufficient to analyze the weight change of the material flow. For example, when the method of the present invention is used in the production of tobacco cigarettes, a timed bump may be manually initiated within approximately a 5,000 cigarette interval.

A number of different timed bumps are preferably initiated, so that an adequate slope may be developed from the resulting data and charted. While various numbers of different timed bumps may prove sufficient, it has been found that a minimum of approximately 6 bumps is required to provide an accurate assessment of the response. Although more than 6 bumps may also be performed, the accomplishment of additional bumps also adds time to the fine tuning process. In the system of the present invention illustrated in FIG. 1, it is also preferable that the timed bumps be of both positive and negative value (3 of each, for example), meaning that the actuator will move some distance both further from, and nearer to the flow. This method is preferably utilized in conjunction with the system of FIG. 1, because as the actuator moves both with and against the force of gravity, different amounts of energy must be applied to the actuator input to effect a similar change in actuator output.

The individual rod measurement data initially collected, and the individual rod measurement data collected during the series of preferably different timed bumps, is then preferably stored, properly compiled, and loaded into a control optimization program 140. Suitable control optimization software is commercially available, such as, for example, MATLAB software, and preferably runs on a PC or other suitable computing device. Based on the collected data it receives, the control optimization software generates tuned control parameters which may then be input into the control system 142 of the present invention. The tuned control parameters allow the PID controller and control loop to more quickly and accurately adjust and control the mean weight of the material flow and subsequently produced articles than would otherwise be possible.

Figure 3:
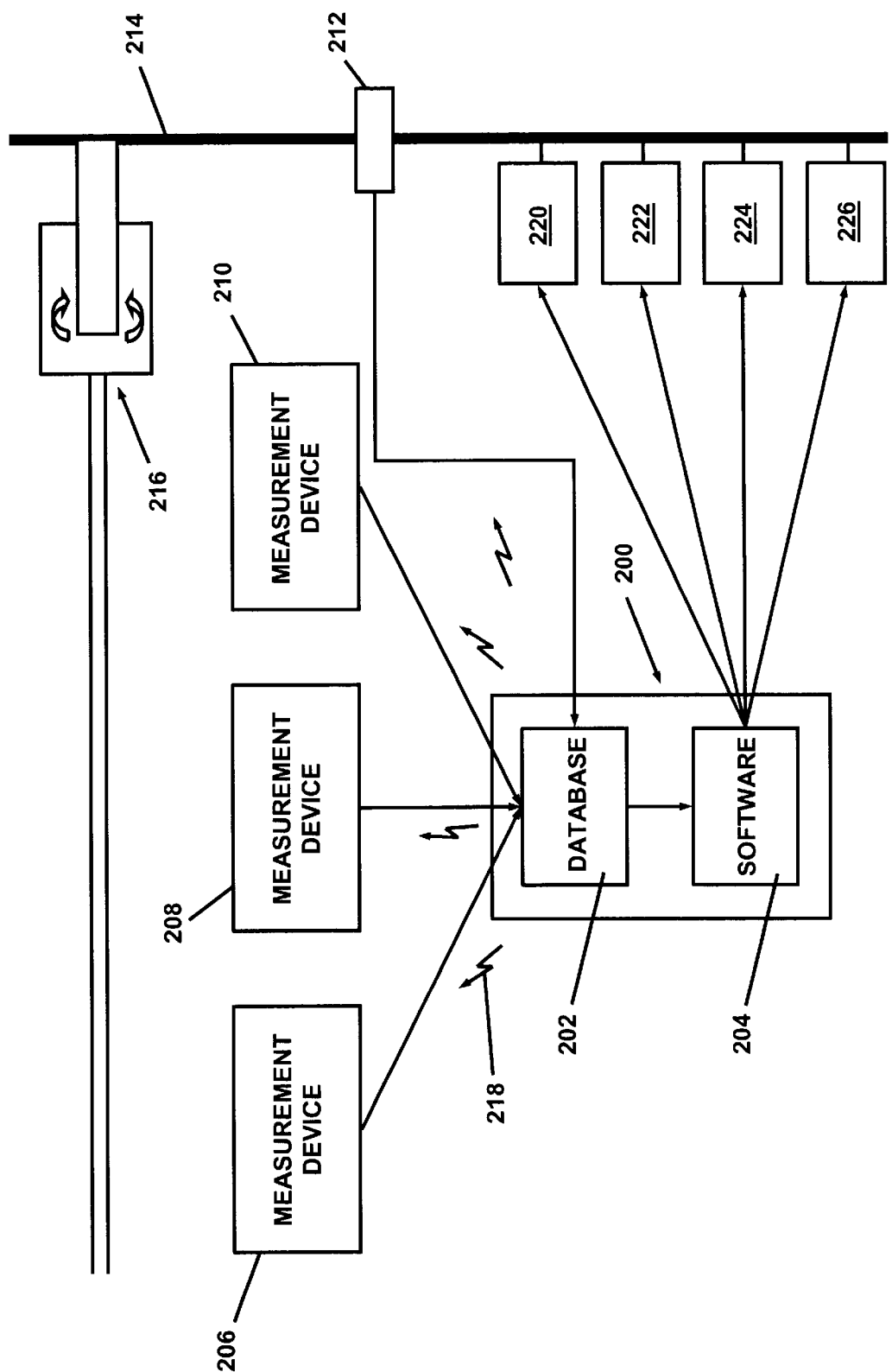
FIG. 3 shows one embodiment of a central control system according to the present invention, wherein various off-line testing equipment is used to measure a multitude of cigarette properties and supply measurement data thereto.

It should be realized that cigarette properties other than weight may also be more accurately controlled by employing the central control system and method of the present invention. As illustrated in the diagram of FIG. 3, providing a central control system 200 having a central database 202 tied to customized optimization software 204, allows the system and method of the present invention to be used to fine tune the other control systems that regulate and control different properties of the cigarettes being manufactured. It is contemplated that data from off-line and/or in-line testing equipment can be sent to the central database 202 for storage. The stored data can then be used to fine tune a corresponding control system, thereby providing for optimization of a particular cigarette property. The optimization process may be accomplished in a manner similar to that described above for performing weight control tuning, or may be performed in a different manner.

As can be observed by reference to FIG. 3, a plurality of testing equipment 206, 208, 210, 212 may be utilized by a typical cigarette production line 214. Such testing equipment is commonly available from, for example, Sodim Instrumentation, in France. As previously stated, such testing equipment 206, 208, 210, 212 may be used to measure length, diameter, weight, texture, moisture content, hardness, and various other cigarette characteristics and properties. This testing equipment 206, 208, 210 may be off-line, such that cigarettes must be removed from the production line 214 and supplied to the testing equipment. The testing equipment 212 may also be in-line, such as is described above with respect to the weight control tuning system and its in-line weight measurement sensor 106. A cigarette production line 214 may also employ both in-line 212 and off-line testing equipment 206, 208, 210.

When off-line testing equipment 206, 208, 210 is employed, cigarettes may be removed from the production line 214 for supply to the testing equipment manually or by automated means. As shown in FIG. 3, a robotic removal apparatus 216 is provided to remove cigarettes from the production line and deposit them with the various off-line testing equipment 206, 208, 210. Such automated removal means are also commercially available from Sodim Instrumentation. The central control system 200 may be utilized to communicate with and control such an automated removal apparatus 216. In this manner, cigarettes can be removed from the production line 214 for testing at predetermined intervals. Alteratively, cigarettes may be removed from the production line 214 and transported to the off-line testing equipment 206, 208, 210 by an operator.

The central database 202 and optimization software 204 of the central control system 200 can be used with virtually any cigarette testing device, regardless of the manufacturer, and regardless of whether the testing equipment is off-line or in-line. Each piece of testing equipment 206, 208, 210, 212 typically measures one or more particular properties of the cigarettes supplied thereto. Thus, each piece of testing equipment 206, 208, 210, 212 produces test data that can be used by the optimization software 204 of the central control device 200 to better control the cigarette manufacturing process. Referring again to FIG. 3, each piece of testing equipment 206, 208, 210, 212 can be seen to be in communication with the central database 202. Each piece of testing equipment 206, 208, 210, 212 supplies test data to the central database 202 regarding the particular cigarette property it measures. The central database 202 stores this test data in an appropriate location corresponding to the particular testing device 206, 208, 210, 212 from which the data was obtained. Therefore, the central database 202 may have individual storage areas for storing data on a multitude of cigarette properties. The central control system 200 may also send control signals 218 to the testing equipment 206, 208, 210, 212 via a control and communication means, as can also be observed in FIG. 3.

Once the central database 202 has received and stored data from a piece of testing equipment 206, 208, 210, 212, the optimization process can begin. The stored data is typically compiled, or otherwise operated on prior to introduction to the optimization software 204. It is contemplated that the optimization software 204 will often consist of a plurality of individual optimization programs, each of which is designed to produce optimized control parameters for use in fine tuning a particular manufacturing process control system. For example, the optimization program used to produce weight control tuning parameters may be different than the optimization program used to produce length control tuning parameters. Each optimization program is adapted to receive the proper data from the central database 202.

Once optimized control parameters are determined by the optimization software 204, the parameters can be supplied to the particular control system 220, 222, 224, 226 for which they were developed. As with the weight control tuning system and method described in detail above, a PID controller can be used along with the optimized control parameters to monitor changes in the cigarette property of interest, and to continue making changes accordingly. Only a single control system may be adjusted at one time, or multiple control systems may be adjusted simultaneously.

From the foregoing, it can be seen that the central database and optimization system and method of the present invention allows for the optimization of numerous cigarette properties during the cigarette manufacturing process. The central control system and method of the present invention can be employed with cigarette manufacturing systems having both in-line and off-line testing equipment, regardless of who manufactured the testing equipment. Thus, the central control system and method of the present invention can be easily integrated into existing cigarette manufacturing operations or installed with new production equipment to provide quick, accurate, and efficient fine tuning of the manufacturing process control systems. While certain embodiments of the present invention are described in detail above to allow one skilled in the art to practice the invention, the scope of the invention is not to be considered limited by such disclosure, and modifications are possible without departing from the spirit of the invention as evidenced by the following claims.

What is claimed is:

1. A central control system for fine tuning individual control systems of a cigarette manufacturing process, said system comprising:

(a) at least one measurement device adapted to measure a particular cigarette properties;

(b) means for transporting cigarettes from said manufacturing process to said at least one measurement device, said cigarettes purposely removed from various predetermined locations within said manufacturing process, each of said predetermined locations corresponding to a step in said manufacturing process that is controlled by one or more of said individual control systems;

(c) a central database adapted to receive and store measurement data from said at least one measurement device;

(d) means for manipulating said stored measurement data; and (e) optimization software in communication with said central database and each of said individual control systems for receiving said manipulated measurement data from said central database and calculating optimized tuning parameters for output to said individual control systems;

whereby said individual control systems use said optimized tuning parameters to adjust the manufacturing process, thereby driving said measured property of said cigarette closer to a target value.

2. The central control system of claim 1, wherein said at least one measurement device is located remotely from said cigarette manufacturing process.

3. The central control system of claim 2, wherein said cigarettes are transported from said manufacturing process to said at least one measurement device by hand.

4. The central control system of claim 2, wherein said cigarettes are transported from said manufacturing process to said at least one measurement device by automated means.

5. The central control system of claim 1, wherein said data is compiled before receipt by said optimization software.

6. The central control system of claim 1, wherein said optimized tuning parameters are sent to each of said individual control systems simultaneously.

7. The central control system of claim 1, wherein said optimized tuning parameters are sent to each of said individual control systems in groups of some number.

8. The central control system of claim 1, wherein said optimized tuning parameters are sent to each of said individual control systems one at a time.

9. The central control system of claim 1, wherein said optimized tuning parameters are sent to each of said individual control systems when said manufacturing process is idle, said individual control systems acting in response to said optimized control parameters upon resumption of the manufacturing process.

10. The central control system of claim 1, wherein said central database has separate storage areas for storing data relating to particular properties of said cigarettes.

11. A central control system for fine tuning a plurality of individual control systems of a cigarette manufacturing process, said system comprising:

(a) a plurality of measurement devices, each adapted to measure a particular property of a cigarette;

(b) means for purposely transporting cigarettes from preselected stages of said manufacturing process to predetermined ones of said plurality of measurement devices, each of said stages controlled by a corresponding one of said plurality of individual control systems;

(c) a centrally located database adapted to receive and store measurement data associated with each of said plurality of measurement devices;

(d) means for manipulating said stored measurement data; and (e) optimization software in communication with both said central database and each of said plurality of individual control systems, said optimization software adapted to receive manipulated measurement data associated with each of said plurality of individual control systems from said central database, to develop optimized tuning parameters for each of said plurality of individual control systems, and to output said optimized tuning parameters to respective ones of said plurality of individual control systems for which they were developed;

whereby each of said plurality of individual control systems uses its optimized tuning parameters to adjust a portion of said manufacturing process, thereby driving said measured property of said cigarette closer to a target value.

12. The central control system of claim 11, wherein at least one of said plurality of measurement devices is located remotely from said cigarette manufacturing process.

13. The central control system of claim 12, wherein said cigarettes are transported from said manufacturing process to said at least one measurement device by hand.

14. The central control system of claim 12, wherein said cigarettes are transported from said manufacturing process to said at least one measurement device by automated means.

15. The central control system of claim 11, wherein said measurement data is compiled before receipt by said optimization software.

16. The central control system of claim 11, wherein said optimized tuning parameters are sent to each of said plurality of individual control systems simultaneously.

17. The central control system of claim 11, wherein said optimized tuning parameters are sent to each of said plurality of individual control systems in groups of some number.

18. The central control system of claim 11, wherein said optimized tuning parameters are sent to each of said plurality of individual control systems one at a time.

19. The central control system of claim 11, wherein said optimized tuning parameters are sent to each of said plurality of individual control systems when said manufacturing process is idle, said individual control systems acting in response to said optimized control parameters upon resumption of the manufacturing process.

20. The central control system of claim 11, wherein said centrally located database has separate storage areas for storing data relating to particular properties of said cigarettes.

* * * * *

UNITED STATES PATENT AND TRADEMARK OFFICE
CERTIFICATE OF CORRECTION

PATENT NO.    : 6,728,594 B1
DATED         : April 27, 2004
INVENTOR(S)   : Kiernan et al.

It is certified that error appears in the above-identified patent and that said Letters Patent is hereby corrected as shown below:

Title page,
Item [75], Inventors, please delete "Mike Iaquinta" and insert -- Mike Iaquinto --

Column 8,
Line 52, please delete "measure a" and insert -- measure --.

Signed and Sealed this

Thirteenth Day of July, 2004

JON W. DUDAS
*Acting Director of the United States Patent and Trademark Office*